Patented Feb. 15, 1949

2,461,966

UNITED STATES PATENT OFFICE 2,461,966

OXIDIZED POLYISOBUTYLENE

Garland H. B. Davis, Elizabeth, N. J., assignor to Standard Oil Development Company, a corporation of Delaware No Drawing. Application September 16, 1944, Serial No. 554,542

3 Claims. (Cl. 260—94)

The present invention relates to improved polymeric materials, relates particularly to linear chain olefinic polymers; and relates especially to means for converting linear hydrocarbon polymers into oxygenated substances which are soluble in oxygenated solvents, remain soluble in hydrocarbon solvents and, in addition, are compatible with oxygen-containing materials such as resins, cellulosic derivatives, and the like.

This application is a continuation-in-part of my prior filed application Serial No. 234,965, filed October 14, 1938, now abandoned.

Linear hydrocarbon polymers, such as the polymers of iso-olefins and, in particular, polyisobutylene and polyisoamylene, are well known. Likewise, polymers of ethylene and propylene made under high pressure with small amounts of oxygen; hydrogenated polymerized di-olefins, particularly butadiene or isoprene, are other examples of materials of this type. These various materials are purely hydrocarbon and are extremely useful as thickening agents for lubricating oils, particularly when they reach molecular weights in excess of 800 or 1,000, as well as for other purposes. They can be produced with molecular weights considerably higher, for example, 15,000 to 20,000, 50,000, 100,000 or even 250,000, but the applicability of these products to various industrial uses is limited to some extent because of their lack of solubility in oxygen-containing solvents, such as the lower alcohols, ketones, acids, esters, ethers and the like, and their incompatibility with oxygen-containing resins as well as with cellulose derivatives such as the acetates and the ethers. It is desirable to modify the hydrocarbon polymers so as to make them soluble in oxygen-containing solvents and compatible with oxygen-containing resins, while preserving their valuable physical properties, and hydrocarbon solubility.

It has been found that this can be done by first preparing the hydrocarbon polymers which have been described above and then submitting the same to an oxidation treatment so as to incorporate a certain amount of oxygen. One of the features of the hydrocarbon polymers is their marked stability against oxidation by air or molecular oxygen which is probably due to their substantially saturated nature, as indicated by low iodine and bromine numbers, but it has been found that they may be oxidized by the use of certain oxidation agents, particularly what may be termed chemical oxidizing agents such as nitric acid, nitric oxides and ozone, as well as by means of dichromates, permanganates and the like. It is characteristic of these oxidation agents that they liberate nascent or atomic oxygen which is required for the oxidation reaction, since the polymers are fully resistant to oxygenation by molecular oxygen and ordinary oxygen-containing substances.

The polymers preferably are first brought into solution in a suitable solvent, preferably a saturated aliphatic hydrocarbon such as naphtha, kerosene or the like, or in a non-reactive halogenated solvent such as carbon tetrachloride, and this solution is then agitated with or treated with the chemical oxidizing agent at an elevated temperature, or if desired the solution may be passed through a heated tube with the oxidizing agent. As stated above, the polymers are resistant to oxidation, especially with air, and the conditions of oxidation with these various oxidizing agents are necessarily severe, depending to some extent on the extent of oxygen incorporation desired. The temperature, time and the amount of the oxidizing agent may be varied and in this way various amounts of oxygen may be introduced up to 30% or 35%, or more, but generally speaking, considerably less oxidation will effect solubility in the more common oxygen-containing solvents. The time of reaction necessarily depends on other factors and may be compensated for by adjustment of these other factors, but in general an hour or more up to as much as 50 or 75 hours is recommended. In some instances as much as four to ten hours are suitable. The temperature depends on the strength or concentration of the oxidizing agent, but generally temperatures of about 212° F. are required but they should not be allowed to go over about 250° F. so as to prevent too extensive depolymerization.

When using nitric acid as the oxidizing agent, commercial concentrated acid of 1.42 gravity may be used successfully but weaker acids are sometimes useful. It is desirable also to use mixtures of concentrated nitric and sulphuric acid but the amount of sulphuric acid should not be too large because it has a marked tendency to cause depolymerization. It is desirable to have less than 30% to 50% of sulphuric acid in the mixture. It is also found that the higher the molecular weight of the initial polymer, the more easily it is degraded or depolymerized, so that when it is desired to maintain the highest possible molecular weight, it is preferred to omit sulphuric acid.

It may be noted that the molecular weight of the oxidized polymer is a function both of the molecular weight of the starting material and of the severity of the oxidation treatment correlated with the amount of the oxygen combined into the polymer. The oxidation treatment always yields some molecular weight reduction, and the more severe the treatment, the greater the breakdown. Thus, if the starting polymer has a molecular weight in the neighborhood of 250,000 or above, and the oxidation treatment is conducted at a minimum temperature with a minimum amount of added oxygen, say 1 or 2%, the molecular weight may be reduced by not more than 5 or 10%, yielding an oxidized polymer containing 2 to 5% of oxygen and a molecular weight nearly as high as the starting material. Alternatively, if the oxidation treatment is extremely drastic, the molecular weight may be broken down to a very low value, although even the most drastic treatment rarely reduces the molecular weight below about 4,500, unless the molecular weight of the starting material was below 5,000 to 8,000.

Thus, an unoxidized polymer having a molecular weight of 250,000 or above may be converted to an oxidized polymer, having 3% to 5% of oxygen and a molecular weight of 225,000 or above, by a relatively gentle oxidation treatment. Alternatively, by a treatment of a 250,000 molecular weight polymer at a high temperature, with strong sulphuric acid and a minimum of nitric acid, a polymer having a molecular weight ranging from 12,500 to 4,500 may readily be obtained, containing from 2 to 5% of oxygen, or by the use of relatively larger quantities of oxidizing agent, such as nitric acid, in the presence of concentrated sulphuric acid and high temperature, a raw polymer having a molecular weight of 250,000 or above may be converted to a polymer having 30% to 35% of oxygen and a molecular weight as low as 12,500 to 4,500. Alternatively, by proper choice of acid concentration and temperature, any desired molecular weight between a value about 10% less than that of the starting material and 4,500 may be obtained, with an oxygen content of any desired value, although a high oxygen content and a low molecular weight breakdown cannot be had simultaneously, a minimum breakdown requiring also a relatively small amount of oxygen, although a high breakdown with a minimum amount of oxygen is readily obtained.

Alternatively, if lower molecular weight starting materials are used, lower molecular weight oxygenated products are necessarily obtained, the same rule of minimum breakdown with minimum oxygen content being still applicable.

As stated before, other oxidizing agents may be used such as potassium permanganate or potassium dichromate. Ozone may also be employed, but of all of these the nitric acid is the preferred oxidizing agent. These are broadly described as "atomic oxidizing agents" to distinguish from air or molecular oxygen which are unsatisfactory.

The product does not greatly differ in appearance from the initial material. It remains clear but usually takes on a yellow to brown color depending upon the severity of the oxidation treatment. The consistency of the product depends to some extent on the original polymer and also on the amount of depolymerization effected through oxidation. Thus, an original solid polymer having a molecular weight of about 100,000 which is carefully treated so as to minimize degration may remain solid after oxidation, while a product of 20,000 to 30,000 original molecular weight which is a soft solid, treated under similar conditions would be converted into a viscous liquid. The amount of nitrogen introduced during the oxidation with nitric acid is quite small: in almost every case, less than .25%. The nature of the chemical group formed by the oxidation is not clear at the present time. A small amount of acid is formed during the treatment and increases during the oxidation, but the amount of oxygen appearing in the form of carboxylic groups seems to be less than 10% of the total oxygen absorbed.

Acetyl values are low, indicating that hydroxyl groups are not formed to any great extent. Qualitative evidence indicates that the oxygen may be largely in the form of carbonyl groups but as yet there is no quantitative demonstration.

The solubility properties of the oxidized material are of the greatest interest. The hydrocarbon polymers, as stated before, are not soluble in most oxygen-containing solvents such as ethyl ether, ethyl alcohol, acetone and other low molecular weight ethers, alcohols and ketones. They are not soluble in acetic and similar acids. Oxidation to a limited extent, for example, 4 to 6%, is sufficient to make the hydrocarbon polymers soluble in ethyl ether. About 15% oxygen is sufficient to make them soluble in amyl acetate and similar ester solvents, while it is necessary to incorporate 28% to 30% of oxygen in order to make them soluble in acids and ketones. All of the products are soluble however in petroleum ether and other hydrocarbon solvents, even after oxidation.

These oxidized polymers are likewise compatible with a great many oxygen-containing substances with which the hydrocarbon polymer is incompatible. It will be understood that there are many such substances which are insoluble in all solvents, for example, the infusible phenol formaldehyde resins and the present polymers are naturally immiscible with these materials, but they are miscible with a great many of the oxygenated resins which can be put into solution in the various solvents mentioned above. Among the various resins may be noted the natural resins such as rosin, ester gums, and oleo resins. More specifically, there may be mentioned colophony and rosin oils. Various synthetic resins may also be admixed with those oxygen-containing polymers and among these may be mentioned the phenol aldehyde resins, aldehyde polymer resins, keto resins, and their various modified forms.

The oxygenated polymers are compatible with various cellulose esters and other derivatives, such as cellulose nitrates, ethers, acetates, propionates, and are very useful in giving such mixtures softness and a degree of elasticity.

The oxidized polymers are also miscible with the unoxidized material, at least up to the extent of 30 or 40% and these mixtures are likewise useful.

The nature of the present products and their methods of manufacture are illustrated by the following examples:

*Example I*

400 grams of polyisobutylene having molecular weight of 13,000 as measured by Staudinger's viscosity method were mixed with 600 grams of an oxidizing agent which consisted of 480 parts by weight of nitric acid (80%) and 120 parts by weight of sulphuric acid (20%). This mixture was heated to 240° F. at which temperature the mixture boiled or gave the appearance of boiling. This treatment was continued for 72 hours when the mixture was diluted with water and the only product separated from the aqueous layer. It was thoroughly washed, leaving a very viscous, slightly yellow oily material which had a molecular weight of 12,500 and contained 28% of oxygen but the nitrogen content was less than .25%.

This product was soluble in ethyl ether, ethyl alcohol, amyl acetate and acetic acid. It was also found to be soluble in various hydrocarbon solvents. It was relatively stable but if heated to a temperature of 125° C. gradually darkened and finally charred. The product was only slightly acid and had low acetyl value below 5.0. It was compatible with nitrocellulose, cellulose ether, as well as with various oxygen-containing materials. For example, the oxidized polymer was found to be miscible in equal proportions with nitrocellulose, with ethyl cellulose, with rosin and with candelilla wax but the polymer was not miscible with alkyd resins or drying oils.

*Example II*

The experiment of Example I was repeated but oxidation was discontinued after 2 hours and a first sample was taken. Oxidation was then resumed for 16 hours longer and a second sample was taken. After further oxidation for 72 hours a third sample was taken. These samples were analyzed and No. 1 was found to contain 6.2% oxygen, sample 2—24.2%, and No. 3—30%. Samples 1 and 2 showed the following analyses:

| Sample | Acid No. | Acetyl Value |
|---|---|---|
| 1 | 12.5 | None |
| 2 | 67.7 | 3.2 |

Solubilities of these samples in various materials are summed up in the following table:

| Sample | Per cent Oxygen | Petroleum Ether | Ethyl Ether | Amyl Acetate | Acetone | Acetic Acid |
|---|---|---|---|---|---|---|
| 1 | 6.2 | Soluble | Soluble | Insoluble | Insoluble | Insoluble |
| 2 | 24.2 | do | do | Soluble | do | do |
| 3 | 26.0 | do | do | do | Soluble | Soluble |

*Example III*

Polyisobutylene having a molecular weight of 6,000 to 8,000 was dissolved in carbon tetrachloride to give a 6% solution. Ozonized air produced by a laboratory ozonizer was passed through a solution for twenty hours at 75° F. The solvent was removed from the product which was found to contain 15% of oxygen and was similar to the materials produced by means of nitric acid oxidation.

*Example IV*

Polyisobutylene was oxidized with nitric acid to a degree sufficient to incorporate 20% oxygen. 10 parts by weight of nitrocellulose and 10 parts of the oxidized polyisobutylene were then dissolved in a mixture of 40 parts of butyl acetate, 20 parts ethyl acetate and 40 parts toluene. The materials were freely soluble and made a homogeneous film when the solvent was allowed to evaporate. To 10 parts of ethyl cellulose, 10 parts of the oxidized polyisobutylene was added and the mixture taken up in a solvent composed of 30 parts ethyl acetate and 30 parts toluene. This likewise gave a clear homogeneous film as the solvent was evaporated.

Unoxidized polyisobutylene was not compatible with either nitrocellulose or ethyl cellulose.

*Example V*

A sample of polyisobutylene having a molecular weight of approximately 100,000 was shredded into small particles. 200 grams of the shredded particles were placed in a flask to which there were added 450 grams of solid potassium permanganate, 500 grams of water and approximately 175 grams of concentrated sulphuric acid of approximately 1.8 sp. g. The mixture was heated on the hot plate for approximately eight hours. During this time the purple color of the permanganate entirely disappeared, indicating the destruction of the permanganate salt. However, the brown color of manganese salts remained. A considerable quantity of gas was evolved and a portion of this gas was bubbled through calcium hydroxide solution. The resulting precipitation indicated the evolution of carbon dioxide, showing that an oxidation reaction was occurring. At the end of eight hours the flask was treated with hydrochloric acid which dissolved the brown manganese salts in part. However, the polymer was badly discolored by manganese salts, and no satisfactory analysis for carbon hydroxide and oxygen could be obtained. The polymer was soluble in both petroleum naphtha and in various of the ester solvents, showing a change in chemical composition. Moreover, the physical properties of the polymer were greatly changed since it was markedly more fluid and very much more sticky.

*Example VI*

Another portion of polyisobutylene having a molecular weight of 100,000 was shredded as in Example V and a 200 gram portion was placed in a two-liter flask to which there was added 400 cc of nitric acid (1.4 sp. g.) and 100 cc of sulphuric acid (approximately 1.7 sp. g.). A reflux condenser was then attached to the flask and the mixture was heated on the hot plate to refluxing temperature which was maintained for twenty hours. A sample was then removed and the refluxing continued for 10 hours more. During the entire refluxing treatment large quantities of brown oxides of nitrogen were evolved, showing that oxidation was occurring. At the end of these time intervals, the respective samples were washed with water by kneading, then were separately dissolved in normal butyl acetate. These solutions were washed with water until all traces of acid were removed. The normal butyl acetate was then volatilized away from the polymer by heat and the last traces were removed by placing the samples in a vacuum oven at 70° C. and 29 inches of mercury vacuum for 12 hours.

The respective samples were then analyzed for nitrogen, carbon, hydrogen, ash and sulfur, and the amount of oxygen present was determined by difference. The analytic results obtained were as follows:

| Sample | Time of Oxidation | Per cent N. | Per cent C. | Per cent H. | Per cent Ash | Per cent S. | Per cent O by Difference |
|---|---|---|---|---|---|---|---|
| 1 | 20 hours | 2.12 | 75.89 | 12.33 | 0.01 | trace | 9.66 |
| 2 | 30 hours | 2.54 | 74.42 | 11.99 | 0.03 | trace | 10.05 |

The physical properties of the oxidized samples were conspicuously different from the properties of the original sample. The oxidized samples were found to be soft, plastic materials in contrast to the original material which was resilient and rubber-like. The oxidized samples showed a remarkable "tackiness" which was entirely different from that shown by polybutene of lower molecular weight and the same consistency; the samples showing a much greater body and a greater tendency to cling to dry surfaces.

Both samples were found to be readily soluble in oxygenated solvents such as diisopropyl ether, isopropyl acetate, normal butyl ether, and the like. They were not soluble in acid nor in ethyl alcohol nor in isopropyl alcohol. They were readily soluble in diisobutylene and similar hydrocarbon solvents.

Solutions of these samples were made up in diisobutylene and treated with dilute aqueous caustic solution. The polymers reacted, forming a compound with the caustic which precipitated from the hydrocarbon solution, thereby showing the presence in the polymer of free acid groups, or possibly aldehyde or ketone groups.

The above examples show the oxidation of isobutylene of various molecular weights, polyisobutylene being the preferred starting material polymer. However, many other polymers may be used, including polyethylene, polypropylene, polyamylene and the like, as well as the low-temperature interpolymers of isobutylene with a polyolefin such as butadiene or other polyolefin up to about 12 or 14 carbon atoms per molecule, or polymethyl pentadiene or the like.

Thus, the invention provides means for combining into an olefinic polymer, from 1% to 30 or 35% of oxygen while bringing the molecular weight down to any desired value above about 4,500.

While there are above disclosed but a limited number of embodiments of the invention, it is possible to provide still other embodiments without departing from the inventive concept herein disclosed, and it is therefore desired that only such limitations be imposed upon the appended claims as are stated therein or required by the prior art.

The invention claimed is:

1. The process of oxidizing a polyisobutylene having a molecular weight within the range between 5,000 and 250,000, comprising the steps of treating the polyisobutylene with a mixture of more than 2 parts nitric acid, having a gravity of 1.4 and 1 part of sulphuric acid having a gravity of 1.7 at a temperature of approximately 240° F. for a substantial time interval to yield an oxidized polymer containing oxygen within the range of 1% to 28%, a nitrogen content less than 0.25%, having a molecular weight within the range between 4,500 and 225,000; the polymer being characterized by solubility both in hydrocarbon solvents and in ethers, alcohols and esters.

2. In the process of oxidizing a high molecular weight, linear, polymer of isobutylene having a molecular weight within the range between 10,000 and 250,000 the step of treating the polymer with a mixture of 1 part sulfuric acid having a gravity of 1.7 and 4 parts nitric acid having a gravity of 1.4 at a temperature within the range between 200° F. to 250° F. to yield a clear, yellow to brown, viscous oxidized polymer having a molecular weight range between 5,000, and 10% less than the molecular weight of the original polymer; and characterized by solubility in ethyl ether, ethyl alcohol, amyl acetate and acetic acid.

3. In the process of oxidizing a high molecular weight, linear, polymer of isobutylene having a molecular weight within the range between 10,000 and 250,000, the step of treating the polymer with a mixture of 1 part sulfuric acid having a gravity of 1.7 and 4 parts of nitric acid, having a gravity of 1.4 at a temperature within the range between 200° F. to 250° F. to yield a clear, yellow to brown, oxidized, viscous polymer having a molecular weight range between 5,000, and 10% less than the molecular weight of the original polymer; and characterized by solubility in ethyl ether, the said oxidized polymer containing between 5% and 35% by weight of combined oxygen and less than 0.25% of combined nitrogen.

GARLAND H. B. DAVIS.

REFERENCES CITED

The following references are of record in the file of this patent:

UNITED STATES PATENTS

| Number | Name | Date |
| --- | --- | --- |
| 1,062,828 | Hofmann | May 27, 1913 |
| 2,092,295 | Van Peski | Sept. 7, 1937 |
| 2,115,306 | Hampton | Apr. 26, 1938 |
| 2,128,574 | Van Peski | Aug. 30, 1938 |
| 2,334,996 | Davis | Nov. 23, 1943 |